June 28, 1960      A. MEULNART      2,942,799
FISHING REEL CARRYING A REMOVABLE SPOOL
Filed June 11, 1957      3 Sheets-Sheet 2
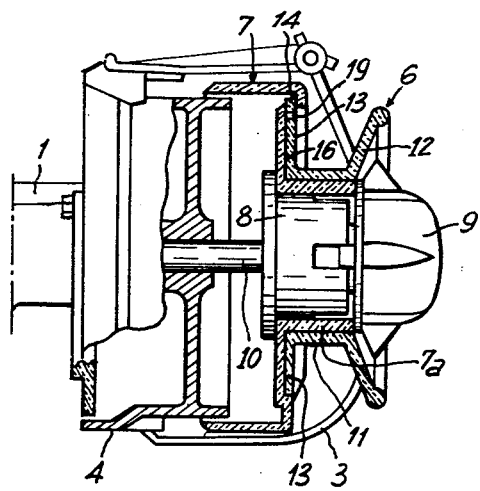
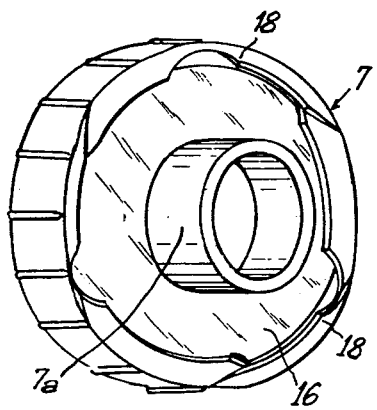 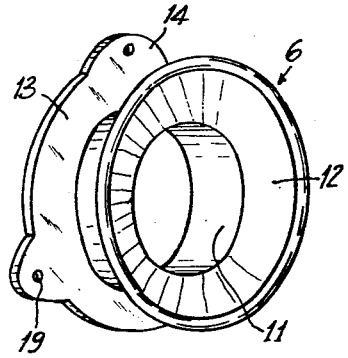

June 28, 1960 A. MEULNART 2,942,799
FISHING REEL CARRYING A REMOVABLE SPOOL
Filed June 11, 1957 3 Sheets-Sheet 3
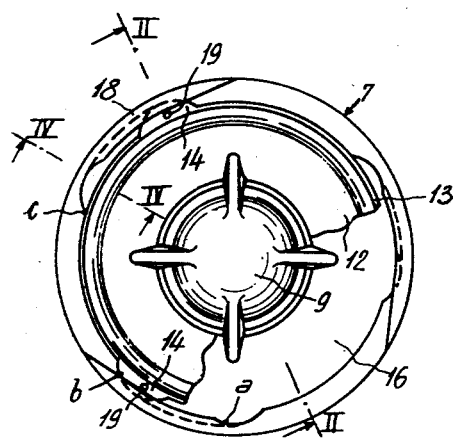
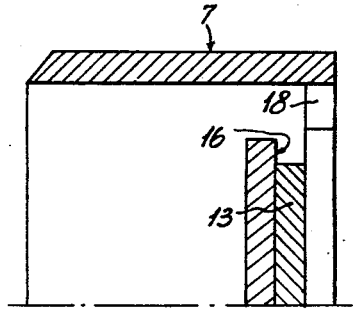
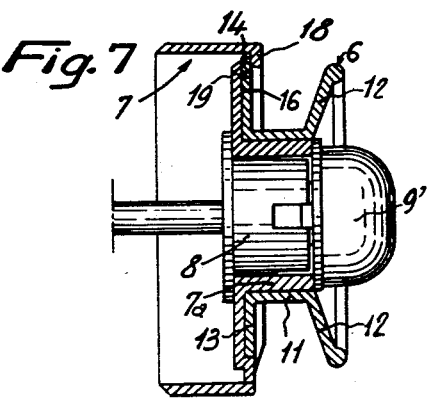
INVENTOR
ANDRÉ MEULNART
By Aaron R. Townshend
ATTORNEY

# United States Patent Office 2,942,799
Patented June 28, 1960

1

2,942,799
FISHING REEL CARRYING A REMOVABLE
SPOOL

André Meulnart, 37 Ave. Paul Doumer, Paris, France

Filed June 11, 1957, Ser. No. 664,985

Claims priority, application France Mar. 8, 1957

6 Claims. (Cl. 242—84.2)

My invention has for its object a fishing reel with a removable spool of a very simple structure, low cost price and easy insertion, so that the angler may at any moment remove from his reel a spool carrying a provision of fishing line and substitute for it another spool also fitted with its fishing line without it being necessary to proceed with any winding in and winding off operation.

To this end, and in accordance with my invention, the spool is provided with a cylindrical bore the diameter of which corresponds with that of the hub of the carrier member adapted to carry it and with a side wall adapted to engage a transverse surface of said carrier member and including radial projections or flaps while the carrier member is provided with a plurality of peripheral locking flanges registering with said transverse surface and located at a distance from the latter which is substantially equal to the thickness of the radial projections on the side wall of the spool. Said peripheral locking flanges extend each only over a section of the periphery of the carrier member in a manner such that, for a predetermined angular position of the spool with reference to the carrier member, said flaps may lie in register with the gaps between the ends of the peripheral locking flanges. It is then possible to shift axially the spool over the hub of the carrier member in order to remove it or insert it; a rotary movement of the spool with reference to its carrier member, starting from this angular position, may thus engage and clamp the radial projections between said transverse surface of the carrier member and its locking flanges, whereby the spool is securely held in position, the system obtained being of the so-called bayonet type.

My invention has also for its object a number of auxiliary features, to wit:

The side wall of the spool provided with radial projections and the corresponding surface of the carrier member are flat.

Said transverse surface of the carrier member includes stops lying in the path of the radial projections on the spool wall so as to limit the amplitude of the pivotal movement of the spool on its carrier member in the direction producing its locking.

Said transverse surface of the carrier member is provided with stops in the path of said radial projections advancing in a direction opposed to the locking direction which starts from the angular position in which said projections are clear of the locking flanges.

The carrier member is constituted by a collar and a web of which one surface forms said transverse surface, said web being secured to the collar only through angular sections defined between the ends of the locking flanges, so that the sections of the web engaged by the radial projections on the side wall of the spool are resilient to some extent.

At least one radial projection on the spool is provided with a small opening through which one end of the fishing line may be threaded in order to be clamped between the outer surface of the radial projection and the above mentioned transverse surface of the carrier member.

2

The carrier member is made of plastic material while the spool is made of plastic material or of metal.

My invention has also for its object the novel article of manufacture constituted by the removable spool of the type defined hereinabove.

I will now disclose my invention with further detail, reference being made to the accompanying drawings showing by way of example and by no means in a limiting sense a preferred embodiment of my invention. In said drawings:

Fig. 2 is a partial sectional view made on line II—II of Fig. 1, said cross-section corresponding also to a cross-section made on line II—II of Fig. 3.

Fig. 3 is a front view corresponding to Fig. 2, with parts cut away.

Fig. 4 is a partial cross-section made on line IV—IV of Fig. 3.

Figs. 5 and 6 are perspective views of details of the assembly.

Fig. 7 is a view similar to Fig. 2 of a modification.

Figure 1:
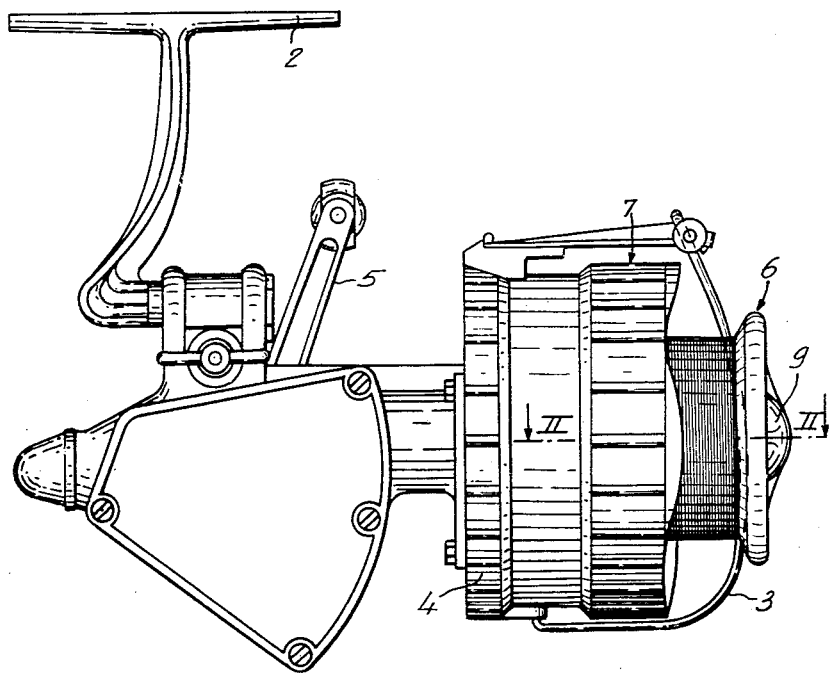
Fig. 1 is an elevational view of a fishing reel including a stationary drum and a removable spool according to my invention.

The reel arrangement illustrated in Figs. 1 and 2 includes a casing 1 provided with a lug 2 which allows securing it to a fishing rod and it includes further a pickup 3 fitted on a rotary drum 4 rotatably mounted on a spindle 10 which protrudes outwardly of the casing 1. The spindle 10 does not rotate, but the drum 4 may be rotated through a crank 5 when it is desired to wind in a fishing line on a stationary spool 6 according to conventional practice in the operation of such reels.

In the embodiment illustrated, the stationary spool 6 is removably fitted as shown in detail in Figs. 2 to 6 on a carrier member 7 having a hollow hub 7a mounted on a shouldered cylindrical support 8 secured to the spindle 10. Friction means of any suitable conventional type, not illustrated, and the adjustment of which is provided through the knob 9 provide a frictional rotational connection between the carrier member 7 and the cylindrical support 8. The spool 6 has a hollow hub 11, an outer side wall 12 and a securing side wall 13. The bore in the hollow hub 11 has a diameter such that the spool 6 may be slipped over the cylindrical section of the carrier member 7. The outer wall 12 of the spool 6 is frustoconical so as to further the winding of the fishing line over the spool 6 and it conceals partly the adjusting knob 9. The securing wall 13 is flat and circular and it is provided along its periphery with three radial projections or flaps 14 the outline of which is substantially semi-circular. Of course, the number of such radial projections is irrelevant.

The carrier member 7 is provided with a transverse bearing surface 16 adapted to be engaged by the outer surface of the securing wall 13 of the spool, and it also includes peripheral locking flanges 18 facing said transverse bearing surface and located at a distance from the latter which is substantially equal to the thickness of the radial projections 14 on the wall 13. These peripheral flanges 18 extend over only angular sections of the periphery of the carrier member 7. In the example illustrated, there are three sectional flanges of which one extends between the point a and the point b while the two others have shapes similar to the first one (Fig. 3).

The end of the flange adjacent the point a terminates as an arcuate fraction defining a notch the radius of which is very slightly larger than that of the flaps or projections on the spool so that an axial movement of the spool over the hub 7a of the carrier member 7 brings the outer surface of the securing wall 13 on the spool into contacting relationship with the bearing surface 16 on the carrier member, the flaps engaging thus the aforesaid arcuate notches.

The web of the carrier member forming the bearing surface 16 is secured to the peripheral portion or ring of the carrier member 7 only in three separate equidistant areas of which one extends between the points b and c as shown in Fig. 3 so that in the other sections which are those registering with the peripheral flanges of the carrier member, said periphery of the web is unsupported and consequently the latter is resilient in axial direction to some extent. The ends of said sections connecting the web with the periphery of the carrier member are also bounded by an arcuate line in the vicinity of the point c so as to allow the axial passage of the part of each spool flap which is opposed to the part engaging the notched end of the peripheral flange of the carrier member whereby said arcuate edge serves as a stop for the flap when moving angularly in a predetermined direction, i.e. counter-clockwise in Figs. 3 and 5. In the opposite direction, the stop is formed by the other end of said connecting section, which is preferably also in the shape of an arcuate line matching the arcuate outline of the flap.

Preferably, the carrier member is made of plastic material while the spool is made of plastic material or of metal, the web forming the bearing surface 16 being thus bestowed with a suitable elasticity and allowing an assembling of the different parts through the bayonet joint constituted by the spool flaps cooperating with the peripheral flanges on the carrier member.

Assuming the spool is fitted on the carrier member as illustrated particularly in Figs. 2 and 3, it is sufficient when it is desired to take it out, to remove first the friction adjusting knob 9, to make the spool turn over its carrier member 7 in a counter-clockwise direction (Fig. 3) until the flaps 14 abut against the arcuate sections of the carrier member such as at c. At this moment, the flaps on the spool register exactly with the corresponding notches in the flanges of the carrier member and it is sufficient to draw the spool axially out so as to release it completely from the carrier member. To return the spool into position, it is obviously sufficient to proceed with the same operations in the opposite sequence. The spool is fitted axially over the carrier member 7, the flaps 14 passing through the arcuate notches after which the spool is turned clockwise (Fig. 3) until the flaps 14 abut against the arcuate sections of the ends of the peripheral flanges 18 facing the movement of said flaps. The flaps 14 are thus clamped between the bearing surface 16 of the carrier member and the peripheral flanges 18 whereby the spool is held fast axially. By reason of the elasticity of the material forming the bearing surface, and chiefly of the unsupported edges of the web 16, and due to the fact that the flaps 14 are slightly clamped in the grooves formed by the gap defined between said web and the peripheral locking flanges 18, the frictional forces developed prevent said flaps from sliding angularly so that the spool is held also angularly and cannot be released in an untimely manner. This being done, the knob 9 is put back into place.

At least one of the flaps 14 of the spool is preferably provided with a small opening 19 through which may be threaded an end of the fishing line so that, at the moment of fitting the spool on the reel, said end of the fishing line be wedged between the outer surface of the flap and the bearing surface 16 of the carrier member.

It will be remarked that the spool for a given length of line wound thereon, requires less material for its execution than the conventional spools provided on fishing reels with a stationary drum. Its manufacture is simpler and its cost price is consequently reduced.

It is also possible to provide a friction adjusting knob, the size of which is such (as shown at 9' in Fig. 7) that it may enter the hub of the removable spool whereby the insertion or removal of the latter does not require removing the knob beforehand.

Obviously, my invention is by no means limited to the embodiment described and illustrated by way of example and many modifications may be brought thereto without widening the scope of the invention as defined in the accompanying claims.

I claim:

1. A fishing reel including a casing, a non-rotatable spindle mounted in said casing and having a portion protruding outwardly of said casing, a cylindrical support fixed on said protruding portion of said spindle, a carrier member having a hollow hub frictionally mounted on said cylindrical support and an upstanding radial wall, a removable line-storing spool adapted to be freely engaged over said hub and having a transverse securing wall which extends radially of said spool and which is adapted to bear flat against said upstanding radial wall of said carrier member when said spool is engaged over the hub of said carrier member, the outer edge of said transverse wall of said spool being formed with radial flaps extending outwardly, while the outer periphery of the upstanding wall of said carrier member has locking flanges located at a distance axially from said upstanding wall of said carrier member, said distance being substantially equal to the thickness of said radial flaps of said spool, said locking flanges extending inwardly over successive sections of the periphery of the carrier member and being separated from one another by radial gaps to form with the spool flaps a bayonet joint, and pick-up means mounted on said spindle for rotation in one direction to wind line on the spool.

2. A fishing reel including a casing, a non-rotatable spindle mounted in said casing and having a portion protruding outwardly of said casing, a cylindrical support fixed on said protruding portion of said spindle, a carrier member having a hollow hub frictionally mounted on said cylindrical support and upstanding radial wall, a removable line-storing spool adapted to be freely engaged over said hub and having a transverse securing wall which extends radially of said spool and which is adapted to bear flat against said upstanding radial wall of said carrier member when said spool is engaged over the hub of said carrier member, the outer edge of said transverse wall of said spool being formed with radial flaps extending outwardly, while the outer periphery of the upstanding wall of said carrier member has locking flanges located at a distance axially from said upstanding wall of said carrier member, said distance being substantially equal to the thickness of said radial flaps of said spool, said locking flanges extending inwardly over successive sections of the periphery of the carrier member and being separated from one another by radial gaps to form with the spool flaps a bayonet joint, said upstanding wall of the carrier member having stops engageable by the flaps of the spool to limit the relative movement of the spool with reference to the carrier member in at least one rotational direction, and pick-up means mounted on said spindle for rotation in one direction to wind line on the spool.

3. A fishing reel including a casing, a non-rotatable spindle mounted in said casing and having a portion protruding outwardly of said casing, a cylindrical support fixed on said protruding portion of said spindle, a carrier member having a hollow hub frictionally mounted on said cylindrical support and an upstanding radial wall, a removable line-storing spool adapted to be freely engaged over said hub and having a transverse securing wall which extends radially of said spool and which is adapted to bear flat against said upstanding radial wall of said carrier member when said spool is engaged over the hub of said carrier member, the outer edge of said transverse wall of said spool being formed with radial flaps extending outwardly, an annular skirt projecting laterally of the upstanding wall of the carrier member and secured thereto exclusively along spaced arcuate sections of its periphery, said annular skirt having inwardly projecting locking flanges in the peripheral sections thereof which extend between said spaced arcuate sections, said locking flanges being located at a distance axially from said upstanding wall of said carrier member, said distance being substantially equal to the thickness of said radial flaps of said spool, said locking flanges having radial notches so as to form with the spool flaps a bayonet joint, and pick-up means mounted on said spindle for rotation in one direction to wind line on the spool.

4. A fishing reel including a casing, a non-rotatable spindle mounted in said casing and having a portion protruding outwardly of said casing, a cylindrical support fixed on said protruding portion of said spindle, a carrier member having a hollow hub frictionally mounted on said cylindrical support and an upstanding radial wall, a removable line-storing spool adapted to be freely engaged over said hub and having a transverse securing wall which extends radially of said spool and which is adapted to bear flat against said upstanding radial wall of said carrier member when said spool is engaged over the hub of said carrier member, the outer edge of said transverse wall of said spool being formed with radial flaps extending outwardly, while the outer periphery of the upstanding wall of said carrier member has locking flanges located at a distance axially from said upstanding wall of said carrier member, said distance being substantially equal to the thickness of said radial flaps of said spool, said locking flanges extending inwardly over successive sections of the periphery of the carrier member and being separated from one another by radial gaps to form with the spool flaps a bayonet joint, at least one of said flaps having a perforation through which one end portion of a fishing line may be threaded and clamped between said one flap and the upstanding wall of the carrier member, and pick-up means mounted on said spindle for rotation in one direction to wind line on the spool.

5. A fishing reel including a casing, a non-rotatable spindle mounted in said casing and having a portion protruding outwardly of said casing, a cylindrical support fixed on said protruding portion of said spindle, a carrier member made of plastic material having a hollow hub frictionally mounted on said cylindrical support and an upstanding radial wall, a removable line-storing spool adapted to be freely engaged over said hub and having a transverse securing wall which extends radially of said spool and which is adapted to bear flat against said upstanding radial wall of said carrier member when said spool is engaged over the hub of said carrier member, the outer edge of said transverse wall of said spool being formed with radial flaps extending outwardly, while the outer periphery of the upstanding wall of said carrier member has locking flanges located at a distance axially from said upstanding wall of said carrier member, said distance being substantially equal to the thickness of said radial flaps of said spool, said locking flanges extending inwardly over successive sections of the periphery of the carrier member and being separated from one another by radial gaps to form with the spool flaps a bayonet joint, and pick-up means mounted on said spindle for rotation in one direction to wind line on the spool.

6. A removable line-storing spool intended to be used in a fishing reel of the type including a casing, a non-rotatable spindle mounted in said casing and having a portion protruding outwardly of said casing, a cylindrical support fixed on said protruding portion of said spindle, a carrier member frictionally mounted on said cylindrical support to receive a line-storing spool, said carrier member having a hollow hub and an upstanding radial wall of which the outer periphery has locking flanges located at a distance axially from said upstanding wall, said locking flanges extending inwardly over successive sections of the periphery of the carrier member and being separated from one another by radial gaps, and pick-up means mounted on said spindle for rotation in one direction to wind a line on the spool, said removable line-storing spool being freely engageable over said hub of said carrier member and having a transverse securing wall which extends radially of said spool and bears flat against said upstanding radial wall of said carrier member when said spool is engaged over the hub of said carrier member, the outer edge of said transverse wall of said spool being formed with radial flaps extending outwardly and the thickness of which is substantially equal to said distance between said locking flanges and said upstanding wall of said carrier member, whereby said flanges of said carrier member form, with said flaps of said spool, a bayonet joint.

References Cited in the file of this patent

UNITED STATES PATENTS

| | | |
|---|---|---|
| 2,380,788 | Prinzivalli | July 31, 1945 |
| 2,705,113 | Bonanno | Mar. 29, 1955 |
| 2,775,417 | Freund | Dec. 25, 1956 |